United States Patent [19]
Hardy et al.

[11] Patent Number: 5,652,311
[45] Date of Patent: Jul. 29, 1997

[54] N-OXIDATION PROCESS FOR AMINO-POLYMERS

[75] Inventors: Frederick Edward Hardy, Newcastle upon Tyne; Geoffrey William Rowland, Jarrow, both of Great Britain; Alan David Willey, Cincinnati, Ohio

[73] Assignee: The Procter & Gamble Company, Cincinnati, Ohio

[21] Appl. No.: 586,777

[22] PCT Filed: Jul. 20, 1994

[86] PCT No.: PCT/US94/08180

§ 371 Date: Mar. 29, 1996

§ 102(e) Date: Mar. 29, 1996

[87] PCT Pub. No.: WO95/04089

PCT Pub. Date: Feb. 9, 1995

[30] Foreign Application Priority Data

Jul. 29, 1993 [EP] European Pat. Off. .............. 93202245

[51] Int. Cl.$^6$ ....................................................... C08F 8/06

[52] U.S. Cl. ................ 525/340; 525/326.7; 525/377.1; 525/333.8; 525/361; 525/364; 525/387

[58] Field of Search ................................. 525/340, 361, 525/364, 387

[56] References Cited

U.S. PATENT DOCUMENTS

| | | | |
|---|---|---|---|
| 4,111,856 | 9/1978 | Haag et al. | 525/326.7 |
| 4,137,386 | 1/1979 | Smith | 525/326.7 |
| 5,059,659 | 10/1991 | Gregor et al. | 525/326.7 |
| 5,064,912 | 11/1991 | Cheng et al. | 525/326.7 |

*Primary Examiner*—Bernard Lipman
*Attorney, Agent, or Firm*—Robert B. Aylor

[57] ABSTRACT

The present invention relates to a process for the N-oxidation of polyamine polymers comprising treating said polyamine polymers with an effective amount of hydrogen peroxide in an aqueous or partly aqueous solution in the presence of heavy metal ion sequestrant and a metal oxide catalyst selected from tungstate, molybdate and vanadate.

16 Claims, No Drawings

N-OXIDATION PROCESS FOR AMINO-POLYMERS

FIELD OF THE INVENTION

The present invention relates to a process for the catalytic N-oxidation of polyamines.

BACKGROUND OF THE INVENTION

One of the most persistent and troublesome problems arising during modern fabric laundering operations is the tendency of some colored fabrics to release dye into the laundering solutions. The dye is then transferred onto other fabrics being washed therewith.

Certain polyamine N-oxide polymers have been found to be very efficient in eliminating transfer of solubilized or suspended dyes during laundering operations. Such polyamine N-oxide polymers are described in copending European Patent Application No. 93201198.4.

This copending European Patent Application also describes a process for making such polymers by the N-oxidation of polyamines using an excess of hydrogen peroxide in the presence of glacial acetic acid. Whilst such a process represents an efficient synthetic route to the polyamine N-oxide polymers its implementation on an industrial scale presents a number of problems. These problems are largely associated with the presence of the glacial acetic acid.

The combination of glacial acetic acid and hydrogen peroxide may lead to formation of peracetic acid in the reaction vessel. Industrially, this presents a safety problem in that when the peracetic level exceeds certain critical levels there is a risk of explosion. This risk is accentuated if the reaction is carried out at a temperature above room temperature.

Since glacial acetic acid is by nature highly corrosive special reaction vessel materials must be employed for a process in which it is a necessary component. The environmental hazards associated with glacial acetic acid also necessitate that it be recycled at the end of any process in which it is employed. Both of these constraints lead to additional complexity and expense in the carrying out of a process utilising large amounts of glacial acetic acid.

There is an additional problem inherent in the polyamine N-oxidation process described above. Residual glacial acetic acid will tend to remain as an impurity in the polyamine N-oxide product giving the product a vinegary malodour. This malodour is particularly undesirable where the polyamine N-oxides are to be incorporated as components of household laundry detergent products.

The Applicants have now discovered an alternative, efficient N-oxidation process for the formation of polyamine N-oxide which does not require the use of glacial acetic acid. This alternative process involves the use of a tungstate, vanadate or molybdate catalyst. The reaction is carried out in aqueous or partly aqueous solution, where the partly aqueous solution is often alcoholic in nature.

SUMMARY OF THE INVENTION

According to one aspect of the present invention there is provided a process for the N-oxidation of polyamine polymers comprising treating said polyamine polymers with an effective amount of hydrogen peroxide in an aqueous or partly aqueous solution in the presence of heavy metal chelating agent and a catalytic amount of metal oxide catalyst selected from tungstate, molybdate and vanadate.

DETAILED DESCRIPTION OF THE INVENTION

According to one aspect of the present invention there is provided a process for the N-oxidation of polyamine polymers. Said polyamine polymers will contain an oxidisable N atom, which will most typically be present as a tertiary amine group or as an N atom component of a heterocyclic aromatic ring system.

Most preferably said polyamine polymers are of the type which in their wholly or partially N-oxidised form may find utility in dye transfer inhibiting compositions, as are described in copending European Patent Application No. 93201198.4. These preferred polyamine polymers contain units having the following structural formula (formula (I))

wherein

P is a polymerisable unit, whereto the oxidisable N atom can be attached, or wherein the oxidisable N atom forms part of, the polymerisable unit.

A is

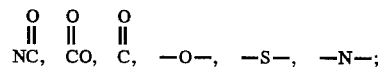

x is 0 or 1;

R are aliphatic, ethoxylated aliphatic, aromatic, heterocyclic or alicyclic groups whereto the oxidisable N atom can be attached, or wherein the oxidisable N atom is part of, these groups.

The oxidisable N atom can be part of the polymerisable unit (P) or can be attached to the polymeric backbone or a combination of both. Suitable polyamine polymers wherein the oxidisable N atom forms part of the polymerisable unit comprise polyamine polymers wherein R is selected from aliphatic, aromatic, alicyclic or heterocyclic groups.

One class of said polyamine polymers comprises the group of polyamine polymers wherein the oxidisable N atom forms part of the R-group. Preferred polyamine polymers are those wherein R is a heterocyclic group such as pyridine, imidazole, pyrrolidine, piperidine, quinoline, acridine and derivatives thereof.

Another class of said polyamine polymers comprises the group of polyamine polymers wherein the oxidisable N atom is attached to the R-group.

Other suitable polyamine polymers are the polyamine polymers wherein the oxidisable N atom is attached to the polymerisable unit. Preferred class of these polyamine polymers are the polyamine polymers having the general formula (I) wherein R is an aromatic, heterocyclic or alicyclic groups wherein the oxidisable N atom is part of said R group. Examples of these classes are polyamine polymers wherein R is a heterocyclic compound such as pyrridine, imidazole and derivatives thereof.

Another preferred class of polyamine polymers are the polyamine polymers having the general formula (I) wherein R are aromatic, heterocyclic or alicyclic groups wherein the oxidisable N atom is attached to said R groups. Examples of these classes are polyamine polymers wherein R groups can be aromatic such as phenyl.

Any polymer backbone can be used, but most preferably the wholly or partially N-oxidised amine polymer formed by the process of the invention is water-soluble and may be used in dye transfer inhibiting compositions. Examples of suitable polymeric backbones are polyvinyls, polyalkylenes, polyesters, polyethers, polyamide, polyimides, polyacrylates and mixtures thereof.

The process of the present invention typically results in N-oxidised polyamine polymers which have a ratio of amine to the amine N-oxide of 10:1 to 1:1000000. However the amount of amine oxide groups present in the polyamine oxide polymer can be varied by appropriate copolymerization or by appropriate degree of N-oxidation. Preferably, the ratio of amine to amine N-oxide is from 2:3 to 1:1000000. More preferably from 1:4 to 1:1000000, most preferably from 1:7 to 1:1000000. The polymers may encompass random or block copolymers where one monomer type is an amine N-oxide and the other monomer type is either an amine N-oxide or not. The amine oxide unit of the polyamine N-oxides has a PKa<10, preferably PKa<7, more preferred PKa<6.

The polyamine polymers for use in the process of the present invention may have essentially any degree of polymerisation. The degree of polymerisation is not critical, however where the N-oxidised product is for use in dye-transfer inhibiting compositions it is preferable that the material has the desired water-solubility and dye-suspending power.

Typically, the average molecular weight of the polyamine polymers for use in accord with the process of the invention is within the range of 500 to 1000,000; preferably from 1,000 to 50,000, more preferably from 2,000 to 30,000, most preferably from 3,000 to 20,000.

In the process of the invention the polyamine polymers are treated with an effective amount of hydrogen peroxide in an aqueous or partly aqueous solution in the presence of a heavy metal ion sequestrant and a catalytic amount of a specific metal oxide catalyst selected from tungstate, molybdate and vanadate.

The level of the polyamine polymers in the aqueous or partly aqueous reaction solution is preferably from 0.5% to 60%, more preferably from 5% to 40% by weight of the aqueous or partly aqueous solution.

The polyamine polymers are treated with an effective amount of hydrogen peroxide. By effective amount it is meant enough hydrogen peroxide to provide an adequate yield of the N-oxidised polyamine polymers. Whilst it is desirable that essentially all of the polyamine polymers are oxidised to their N-oxidised form an adequate yield for this reaction is typically more than 70 mole % N-oxidised product, more preferably more than 80 mole % N-oxidised product, most preferably more than 90 mole % N-oxidised product.

The effective amount of hydrogen peroxide is typically from 1 to 10, preferably from 1 to 5 moles hydrogen peroxide per mole of polyamine polymer.

The Applicants have however found that with certain polyamine polymers, particularly those including an imidazole group, such as polyvinylimidazole, it is essential to control the oxidation process carefully to prevent overoxidation of these polymers. When the polyamine polymers are such that overoxidation may be a problem it is desirable that the level of hydrogen peroxide is restricted to levels of from 1 to 1.5, preferably from 1 to 1.2 moles of hydrogen peroxide per mole of polyamine polymer.

The N-oxidation process of the invention is carried out in the presence of a heavy metal ion sequestrant. The heavy metal ion sequestrant is present at a level of from 0.001% to 2%, preferably from 0.01% to 1%, more preferably from 0.05% to 0.5% by weight of the aqueous or partly aqueous reaction solution.

Suitable heavy metal ion sequestrants for use in the process of the invention include organic phosphonates, such as amine alkylene poly (alkylene phosphonate), alkali metal ethane 1-hydroxy disphosphonates, nitrilo trimethylene phosphonates.

Preferred among above species are diethylene triamine penta (methylene phosphonate), hexamethylene diamine tetra (methylene phosphonate) and hydroxy-ethylene 1,1 disphosphonate.

The phosphonate compounds may be present either in their acid form or as a complex of either an alkali or alkaline metal ion, the molar ratio of said metal ion to said phosphonate compound being at least 1:1. Such complexes are described in U.S. Pat. No. 4,259,200.

Other suitable sequestrant for use in accordance with the invention include nitrilotriacetic acid and polyaminocarboxylic acids such as ethylenediaminotetracetic acid, ethylenetriamine pentacetic acid, ehtylenediamine dissuccinic acid or the water soluble alkali metal salts thereof. Especially preferred is ehtylenediamine-N,N'-disuccinic acid (EDDS) or the alkali metal, alkaline earth metal, ammonium, or substituted ammonium salts thereof, or mixtures thereof. Examples of such preferred sodium salts of EDDS include $Na_2EDDS$ and $Na_3EDDS$. Examples of such preferred magnesium complexes of EDDS include MgEDDS and $Mg_2EDDS$.

Still other suitable heavy metal ion sequestrants for use herein are iminodiacetic acid derivatives such as 2-hydroxyethyl diacetic acid or glyceryl imino diacetic acid, described in EPA 317 542 and EPA 399 133.

The heavy metal ion sequestrant herein can consist of a mixture of the above described species.

The process of the invention is carried out in an aqueous or partly aqueous solution. Suitable solvents for inclusion in a partly aqueous solution include alcohols such as methanol, ethanol, n-propanol, n-butanol, t-butanol and any mixtures thereof.

The pH of the solution may be controlled to achieve satisfactory rates of reaction and yield of product but preferably lies in the range from 1 to 10.

Where the metal oxide catalyst is tungstate it is desirable that the pH of the solution should be between 2 and 6, preferably between 2 and 4. Where the metal oxide catalyst is molybdate it is desirable that the pH should be between 3 and 7 preferably between 4 and 6.

The N-oxidised product of the reaction process is typically acidic in nature and its formation will therefore tend to reduce the pH of the reaction solution. It is therefore highly desirable that the pH of the solution at the start of the reaction is towards the upper value of the broadiest range as given above for both tungstate and molybdate. As the acidic N-oxidised product is formed the pH of the solution will become lower but desirably will not fall below the lower value of these broadest ranges.

The process of the invention is carried out in the presence of a catalytic amount of metal oxide catalyst selected from tungstate, molybdate and vanadate.

By tungstate it is meant tungsten trioxide ($WO_3$), any salts thereof especially the water soluble quaternary ammmonium and alkali metal tungstates, most especially sodium tungstate ($Na_2WO_4$) and tungstic acid ($H_2WO_4$) and mixtures thereof. By molybdate it is meant molybdenum trioxide ($MoO_3$) and any salts thereof, especially the water soluble quaternary ammmonium and alkali metal molybdates, most especially sodium molybdate ($Na_2MoO_4$) and molybdic acid ($H_2MoO_4$) and mixtures thereof. By vanadate it is meant vanadium pentoxide ($V_2O_5$), and any salts thereof especially the water soluble quaternary ammmonium and alkali metal vanadates, most especially sodium vanadate ($NaVO_3$).

By catalytic amount of a metal oxide catalyst it is meant sufficient catalyst to enhance the rate of the N-oxidation process to a rate suitable for the efficient working of the process on an industrial scale. Typically, the presence of the catalyst will speed up the rate of reaction to be at least ten times that where no catalyst is present.

The metal oxide catalyst is typically present at a level of from 0.001% to 2%, preferably from 0.01% to 1%, more preferably from 0.05% to 0.5% by weight of the aqueous or partly aqueous solution.

The temperature at which the process of the invention is carried out may be controlled to achieve satisfactory rates of reaction and yield of product. Typically the process is carried out at a temperature of from 30° C. to 100° C.

EXAMPLES

Example 1

In a process in accord with the invention 1 part poly L-histidine (ex Sigma) was added to a solution of:

0.07 parts sodium tungstate (ex Merck(TM))

0.24 parts *DTPMP solution (26% active)

and 4.43 volumes hydrogen peroxide solution (30% w/v ex Merck(TM))

The pH of the mix was adjusted from approx. 7 to approx. 6 with hydrochloric acid (15% w/w) and the resultant mix heated to 60–65 deg. C (when all the solid dissolved) and held for 4 hours.

Testing with starch/potassium iodide paper indicated excess peroxide still present and the pH was found to have fallen to approx. 4.

The pale yellow solution was added, with agitation, to acetone (200 volumes) to precipitate a white solid which was filtered off, washed and dried.

The dried solid was redissolved in water (4.7 volumes) and the pH adjusted from approx. 5 to approx. 1–2 (with conc. hydrochloric acid) when a white, gelatinous precipitate formed. This was removed by filtration and the filtrate added, with agitation, to acetone (200 volumes) to re-precipitate the N-oxidised product, which was filtered, washed and dried.

Proton nmr analysis confirmed the product to be essentially 100% N-oxidised product.

Example 2

In a process in accord with the invention 10 parts poly 4-vinylpyridine 10% solution in 50:50 t-butanol/water (ex Cassella(TM)) from the polymerisation process were added to a solution of:

0.08 parts sodium tungstate (ex Merck(TM))

0.36 parts *DTPMP solution (26% active)

3.43 volumes hydrogen peroxide soln. (30% w/v ex Merck (TM))

The pH of the solution was adjusted from 7.1 to 5.4 (with conc. hydrochloric acid) and the mix refluxed for 2 hours when a pale yellow viscous oil separated. This was dissolved by the addition of a further 3.43 volumes of 30%w/v hydrogen peroxide solution and the mix was refluxed a further 2 hours.

After cooling the solution was added, with agitation, to acetone (200 volumes) when a viscous yellow syrup separated. The supernatant liquors were decanted and the syrup further treated with acetone to form a pale yellow solid, which was filtered, washed and dried in vacuo.

Proton nmr analysis indicated 80 mole% N-oxidised product.

Example 3

In a process in accord with the invention 1 part poly 4-vinylpyridine (solid ex Cassella(TM)) was added to a solution of:

0.086 parts sodium tungstate 0.36 parts *DTPMP solution (26% active)

5.7 volumes hydrogen peroxide solution (30% w/v ex Merck (TM))

1.9 volumes ethanol.

*DTPMP=Sodium salt of diethylene triamine penta (methylene phosphonic acid)

The mix was held at 60–65 deg C for 4 hours then allowed to cool before adding to acetone (200 volumes) to precipitate a pale yellow solid. The solid was isolated by filtration, washed with acetone and dried under vacuum.

Proton nmr analysis indicated >90 mole% N-oxidised product.

Example 4

In a process in accord with the invention a solution of:

0.08 parts sodium molybdate dihydrate (ex Merck(TM))

0.095 parts ethylene diamine tetra acetic acid, disodium salt (ex Merck(TM))

5.71 volumes hydrogen peroxide solution (30% w/v ex Merck (TM))

5.71 volumes ethanol was made up and to this dark red solution was added:

1.0 part poly 4-vinylpyridine (solid ex Cassella(TM))

The mix was heated to 60–65 deg C when the solid dissolved to form a red solution of pH approximately 6–7.

After 1.5 hours at 60–65 deg C the red colour had faded to pale yellow and a further aliquot (2.86 volumes) of hydrogen peroxide solution was added.

Further aliquots (2.86 volumes each) of hydrogen peroxide solution were required after another 45 minutes, then another 60 minutes to regenerate the reddish colour.

After a total of 4.25 hours at 60–65 deg C in the presence of the red species, the solution (pH approximately 6) was cooled and added, with agitation, to acetone (150 volumes). The supernatant liquors were decanted and the residual yellow sticky solid was re-slurried in acetone, gravity filtered, washed with acetone and dried in vacuo.

270 MHz proton nmr analysis indicated 81 mole % yield of N-oxidised product.

We claim:

1. A process for the N-oxidation of polyamine polymers comprising treating said polyamine polymers with an effective amount of hydrogen peroxide in an aqueous or partly aqueous solution in the presence of heavy metal ion sequestrant and a catalytic amount of metal oxide catalyst selected from tungstate, molybdate and vanadate.

2. A process according to claim 1 wherein said polyamine polymers contain units having the following structural formula:

wherein

P is a polymerisable unit, whereto the oxidisable N atom can be attached, or wherein the oxidisable N atom forms part of, the polymerisable unit.

A is

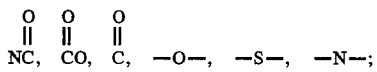

x is or 0 or 1;

R are aliphatic, ethoxylated aliphatic, aromatic, heterocyclic or alicyclic groups whereto the oxidisable N atom can be attached, or wherein the oxidisable N atom is part of, these groups.

3. A process according to claim 1 wherein said polyamine is present at a level of from 1% to 40% by weight of said aqueous or partly aqueous solution.

4. A process according to claim 1 wherein said metal oxide catalyst is present at a level of from 0.001% to 2% by weight of said aqueous or partly aqueous solution.

5. A process according to claim 1 wherein said heavy metal ion sequestrant is selected from polycarboxylate or polyphosphonate heavy metal ion sequestrants and is present at a level of from 0.005% to 2% by weight of said aqueous or partly aqueous solution.

6. A process according to claim 1 wherein said partly aqueous solution comprises an alcohol selected from methanol, ethanol, n-propanol, n-butanol, t-butanol and any mixtures thereof.

7. A process according to claim 1 wherein said process is carried out at a temperature of from 30° C. to 100° C. and at a pH of from 1 to 10.

8. A process according to claim 2 wherein P is a polymerisable unit wherein the oxidisable N atom is attached to and wherein R is selected from an aromatic or heterocyclic group.

9. A process according to claim 8 wherein the oxidisable N atom forms part of a heterocyclic R-group.

10. A process according to claim 9 wherein the heterocyclic R-group is selected from pyridine, imidazole and derivatives thereof.

11. A process according to claim 2 wherein the oxidisable N atom is attached to the R-group.

12. A process according to claim 11 wherein R is a phenyl group.

13. A process according to claim 2 wherein P is a polymerisable unit, whereto the oxidisable N atom forms part of the polymerisable unit and wherein R is selected from an aromatic or heterocyclic group.

14. A process according to claim 13 wherein the oxidisable N atom forms part of the R-group.

15. A process according to claim 14 wherein the R-group is selected from pyridine, imidazole and derivatives thereof.

16. A process according to claim 2 wherein the polymeric backbone is derived from the group of the polyvinyl polymers.

* * * * *